United States Patent [19]

Lemineur et al.

[11] 3,924,177

[45] Dec. 2, 1975

[54] TAPE LOOP TENSION ARM POSITION INDICATOR SYSTEM

[75] Inventors: Joseph Lemineur, Mons; Rene Arys, Genappe, both of Belgium

[73] Assignee: Ampex Corporation, Redwood City, Calif.

[22] Filed: Feb. 25, 1974

[21] Appl. No.: 445,257

[30] Foreign Application Priority Data

May 7, 1973 Belgium .............................. 130845

[52] U.S. Cl............. 324/61 R; 242/75.51; 242/184; 242/190; 323/93; 340/200

[51] Int. Cl.².......................................... G01R 27/26

[58] Field of Search........ 324/61 R; 242/75.51, 184, 242/189, 190; 317/246; 323/93; 340/200

[56] References Cited

UNITED STATES PATENTS

| | | | |
|---|---|---|---|
| 2,985,396 | 5/1961 | Johnson | 242/190 |
| 3,312,892 | 4/1967 | Parnes | 323/93 |
| 3,318,547 | 5/1967 | Bejach | 242/190 |
| 3,641,414 | 2/1972 | Thompson et al. | 318/662 |
| 3,665,270 | 5/1972 | Ayers | 242/190 X |
| 3,668,672 | 6/1972 | Parnell | 340/200 |
| 3,683,402 | 8/1972 | Parnell | 340/200 |
| 3,702,957 | 11/1972 | Wolfendale | 324/61 R |
| 3,732,553 | 5/1973 | Hardway, Jr. | 340/200 |
| 3,783,374 | 1/1974 | Eide et al. | 324/61 R X |

*Primary Examiner*—Stanley T. Krawczewicz

[57] ABSTRACT

A member position indicating system includes a pair of inexpensive variable capacitances which vary differentially with member position connected to receive complementary squarewave reference signals and a detector responsive to the output of the capacitances and the reference signals. The detector provides a bipolar DC system output signal which varies linearly with member position and which is readily usable by a servo as a feedback signal for control of the member. A sector plate assembly provides the differential capacitances without sliding electrical contacts for excellent reliability.

3 Claims, 3 Drawing Figures

TAPE LOOP TENSION ARM POSITION INDICATOR SYSTEM

BACKGROUND OF THE INVENTION

1. Field of the Invention

This invention relates to position indicators and more particularly to position indicators which generate a DC output signal indicating the position of a magnetic tape transport tape loop tension arm.

2. History of the Prior Art

A digital magnetic tape transport typically includes a magnetic read/write head past which tape is moved and has a file reel and a take-up reel positioned on either side of the head. A capstan is positioned to control tape motion in the vicinity of the head and at least one buffer tape loop is provided adjacent each reel to permit control of the capstan to be substantially independent of the reels. The tape loops are provided by either vacuum chambers or tape loop tension arms and the reels are driven to maintain the tape loops at selected loop lengths.

When tape loops are provided by tension arms each arm is typically coupled to a potentiometer having a resistance varying with arm position. A voltage applied across the potentiometer generates a signal indicative of actual tension arm position which can be compared with a signal indicating desired tension arm position to generate an error signal for driving the reel motor to generate a desired tape loop length and corresponding arm position. However, potentiometers possess the inherent unreliability of most mechanical components and the position signal is subject to drift because of age, temperature change and power supply voltage change.

Alternatively, a mirror can be connected to the tension arm to reflect an amount of light which varies with arm position from a light source onto a photosensor. However, this arrangement is also subject to drift is expensive and requires a careful, precise adjustment.

SUMMARY OF THE INVENTION

A position indicator system for a movable member such as a tape transport tape loop tension arm includes a pair of differential capacitive reactances connected to vary with arm position, a waveform generator connected to apply complementary square-wave reference signals across the reactances, an amplifier responsive to the combined outputs from the reactances, and a detector circuit responsive to the amplifier output for generating a DC position signal having a magnitude proportional to the magnitude of the amplifier output and a polarity dependent upon its phase relationship to a selected reference signal.

More particularly, the reactances may be provided by a sector plate assembly having pairs of capacitive sector plates mounted on a printed circuit board with a third, grounded plate positioned therebetween and connected to move with tension arm position. The absence of sliding mechanical contact increases reliability and the use of reactive components minimizes power consumption. With proper filtering a single operational amplifier may be used to amplify both the AC output from the reactances and the DC system output. A simple diode bridge phase detector circuit may be used to gate the amplified AC signal to a sampling capacitor under control of the complementary reference signals to generate a DC position signal which may be amplified by the same amplifier to produce the system output. Such an arrangement provides a reliable, inexpensive position indicator system with a relatively precise, linear, drift free DC output signal having a ground potential center point indication. In addition, the dual polarity nature of the position signal makes it readily usable by a connected servo for bi-directional control without further modification.

BRIEF DESCRIPTION OF THE DRAWINGS

A better understanding of the invention may be had from a consideration of the following detailed description taken in conjunction with the accompanying drawings in which.

DETAILED DESCRIPTION

Figures 1, 3:
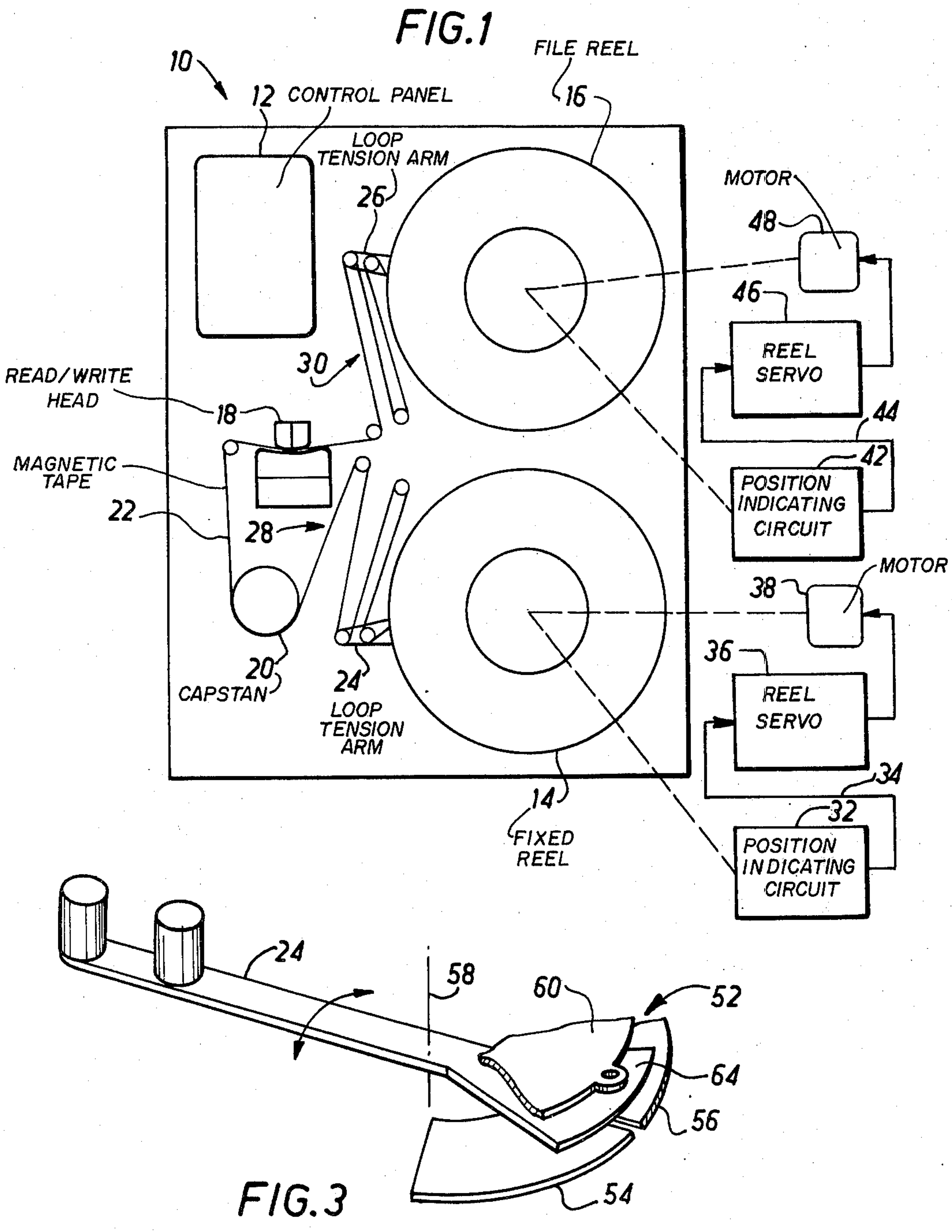
FIG. 1 is a block diagram representation of a digital magnetic tape transport in accordance with the invention.
FIG. 3 is a somewhat simplified partly broken away perspective view of a tape loop tension arm and sector plate assembly in accordance with the invention.

Making reference to FIG. 1, there is shown a generally conventional magnetic tape transport 10 having a control panel 12, a fixed reel 14, a file reel 16, a read/write head 18 and a capstan 20 which controls the movement of magnetic tape 22 between the reels 14 and 16 and particularly past the head 18. Tape loop tension arms 24, 26 are pivotally mounted to rotate about the same axis as the reels 14, 16 are biased to maintain buffer tape loops 28, 30 respectively adjacent the tape reels 14, 16. The tape loops 28, 30 permit the capstan 20 to be controlled substantially independently of the reels 14, 16. A position indicating circuit 32 generates a DC system position signal 34 indicative of the position of the tension arm 24. A fixed reel servo 36 controls a reel motor 38 to drive the reel 14 in response to the position signal 34. Although a variety of conventional reel motor servo techniques may be employed, a rather simple arrangement is advantageously used in the system 10 wherein the reel motor 38 is driven in a selected direction at a velocity which moves tape somewhat faster than the capstan 20 when the position signal 34 is above a selected magnitude and wherein the motor 38 is braked when the position signal 34 is below a selected magnitude. The direction in which the reel motor 38 is driven depends upon the polarity of the DC position signal 34.

Control of the file reel 16 is substantially identical to that of the fixed reel 14 with a position indicating circuit 42 generating a DC position signal 44 for controlling a reel servo 46. The servo 46 drives a reel motor 48 which is mechanically coupled to the file reel 16.

Figure 2:
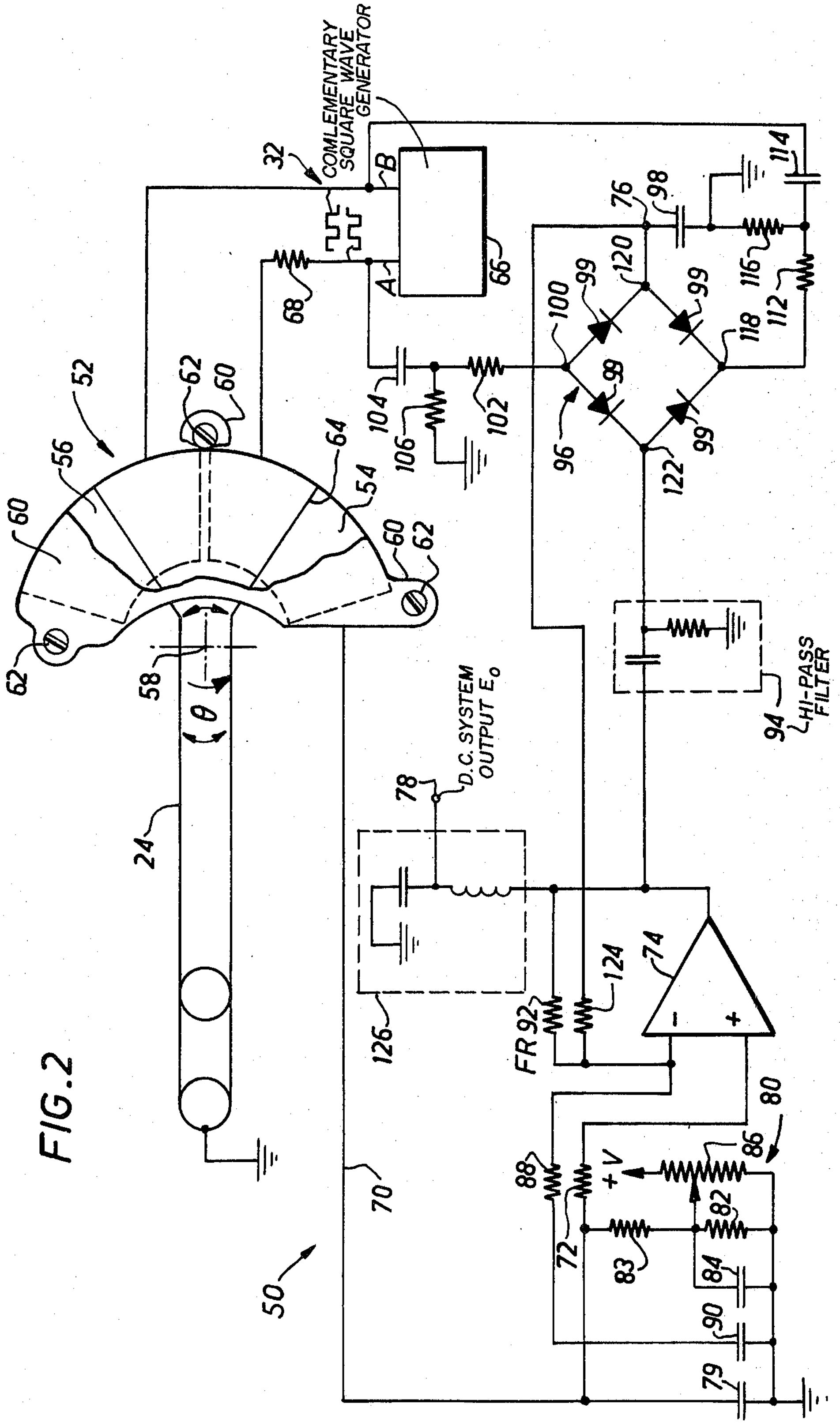
FIG. 2 is a partly broken away plan view, partly block diagram and dpartly schematic representation of a tension arm position indicating system in accordance with the invention for use in the tape transport shown in FIG. 1.

Referring now to FIGS. 2 and 3, a position indicating system 50 for the fixed reel 14 is shown in detail as including the tension arm 24 and the position indicating circuit 32. A pair of capacitive reactances are provided by a sector plate assembly 52. Two lower plates 54, 56 of the assembly 52 are substantially symmetrical in shape about a line passing through an axis of rotation 58 for the tension arm 24 and may be deposited on a printed circuit board. The lower plates 54, 56 have inner and outer sides in the shape of arcs of smaller and larger circles which are concentric about an axis of rotation 58 of the tension arm 24. The lower plates 54, 56 are positioned in end-to-end abutting relationship and are electrically insulated from one another. A single large upper plate 60 is disposed in spaced apart opposing relation above the lower plates 54 and 56, and electrically forms a pair of interconnected opposite capacitor plates for the capacitances associated with the two lower plates 54, 56. The upper plate 60 is maintained at a spaced apart distance of about 0.375 inch above the lower plates 54, 56 by three suitable bolt and spacer assemblies 62 which are positioned to allow the tension arm 24 to rotate clockwise to a nearly vertical position when the transport 10 is in a tape loading mode. The upper plate 60 generally conforms to the shape of the combined lower plates 54, 56 and is at least substantially coextensive with them.

A grounded third plate 64 is disposed in the space between the lower plates 54, 56 and the upper plate 60. The shape of the central plate 64 generally conforms to the shape of one of the lower plates 54, 56. Plate 64 is connected to rotate with the tension arm 24 and during normal operation it rotates between a first limit wherein it is generally coextensive with the lower plate 54 and a second limit wherein it is generally coextensive with lower plate 56.

A complementary square-wave generator 66 generates a first square-wave reference signal A at a frequency of about 300 KHz and a second complementary reference signal B which is substantially equal in magnitude but opposite in phase to the signal A. Signal A is applied through a 5.1 K ohm resistor 68 to the lower plate 54 and signal B is connected to the lower plate 56. The grounded central plate 64 in effect inhibits the capacitive coupling between the lower plates 54, 56 and the upper plate 60 throughout the area occupied by the central plate 64. The capacitive couplings $C_{54}$ and $C_{56}$ between upper plate 64 and lower plates 54, 56, respectively thus vary differentially as the center plate rotates from the centered position in which it is shown. As the tension arm rotates clockwise $C_{54}$ decreases while $C_{56}$ increases and the opposite occurs during counterclockwise rotation.

In the central position of tension arm 24 in which it is shown in FIG. 2, upper plate 60 is connected to equal and opposite voltages (signals A and B) through equal capacitances $C_{54}$ and $C_{56}$ and therefore remains substantially at ground potential. However, as tension arm 24 rotates counterclockwise $C_{54}$ becomes larger than $C_{56}$ and a voltage appears on upper plate 60 as a square wave signal in phase with reference signal A and with a magnitude increasing with the differential between $C_{54}$ and $C_{56}$. Similarly, as tension arm 24 rotates clockwise from the depicted neutral position a square wave signal appears on upper plate 60 in phase with reference signal B. Again, the magnitude increases as tension arm 24 rotates away from the depicted neutral position. The single upper plate 60 thus effectively combines the outputs of separate capacitances $C_{54}$ and $C_{56}$ to provide an AC position signal 70 dependent upon the relative values thereof.

The AC position signal 70 is connected through a 10 ohm resistor 72 to the positive input of an operational amplifier 74. Amplifier 74 has conventional power supplies and stabilization which are omitted for clarity. The use of proper filtering allows operational amplifier 74 to simultaneously, but independently provide amplification for both the AC position signal 70 and a DC position signal 76 to provide a DC system output signal 78.

A 56 pf capacitor 79 is connected between upper plate 60 and ground to provide a constant impedance load for the sector plate assembly 52. Because the loading effect of amplifier 74 is small with respect to that of capacitor 79, changes in amplifier 74 with time and temperature have very little effect on the loading of sector plate assembly 52.

An offset circuit 80 may be omitted in most tape transport application where the precision of the zero point is not critical but is described for completeness and includes a pair of voltage divider resistors 82, 83 of 47 K ohms and 20 K ohms respectively connected between upper plate 60 and ground. The conductor which is common to resistors 82 and 83 is connected both through a 2.2 $\mu$f capacitor 84 to ground and to a potentiometer 86. The offset network 80 may be used to compensate for any input current drawn by amplifier 74 or to adjust the zero output position for the tension arm 24.

A 1.2 K ohm AC input resistor 88 is connected in series with a 0.022 $\mu$f blocking capacitor 90 between the negative input and ground and operates in conjunction with a 120 K ohm feedback resistor FR 92 connected between the output and ground to provide an AC gain of 100. The capacitor 90 blocks DC current through resistor 88, preventing it from affecting DC gain and also serves to balance the capacitive load on the positive input terminal.

The output of amplifier 74 is also connected through a high pass filter 94 which separates the DC system output signal by passing only the AC position signal to a four diode bridge phase detector or switching circuit 96 which operates in conjunction with a holding capacitor 98 to detect both the phase and magnitude of the 100 times amplified AC position signal from upper plate 60. Switching circuit 96 has two shunt connected pairs of series connected diodes 99 having similar polarities.

An anode terminal 100 of switching circuit 96 is connected through a 5.1 K ohm resistor 102 and a 0.1 $\mu$ f capacitor 104 to square-wave reference signal A. A 2 K ohm resistor 106 is connected between ground and the junction of resistor 102 and capacitor 104 and operates in conjunction with capacitor 104 to isolate the switching circuit 96 from any DC bias in reference signal A. Similarly a symmetrical network including resistor 112, capacitor 114 and resistor 116 connects the cathode terminal 118 of switching circuit 96 to square-wave reference signal B.

Resistors 102 and 112 serve as balanced load resistors, causing the output terminal 120 to follow the input terminal 122 of switching circuit 96 whenever it is turned on. The circuit 96 is turned on as the diodes conduct during the half of each cycle that signal A is positive and signal B is negative. During the other half of each cycle the diodes are reverse biased, thereby isolating the output 120 from the input 122.

If tension arm 24 is positioned so that $C_{54}$ is greater than $C_{56}$, the signal at input 122 will be in phase with reference signal A so that a positive voltage will appear at input 122 during the half of each cycle that the switch 96 is closed so that holding capacitor 98 will charge to a positive voltage having a magnitude dependent upon the magnitude of the amplifier AC position signal which in turn depends upon the displacement of tension arm 24 from the neutral position. Capacitor 98 also filters any AC signal which is generated by the sampling process or which comes through a 24 K ohm input resistor 124 connected between capacitor 98 and the negative input to amplifier 74.

Since the magnitude of the input resistor 124 is one-fifth that of the feedback resistor FR 92, the output of amplifier 74 is biased to an inverted voltage five times the voltage on the holding capacitor 98. This voltage is passed through a low pass filter 126 to separate the AC signal and provide the DC system output 78 having a magnitude dependent upon the displacement of tension arm 24 from the neutral position and a polarity dependent upon the direction of the displacement. High pass filter 94 prevents this DC bias from being communicated to the switch input 122.

The DC system output signal 78 is thus a bipolar DC signal having a magnitude proportional to the deviation of tension arm 24 from a neutral position. The DC system output signal 78 is linear in the sense that it varies with the first power of the angular position $\theta$ of the tension arm 24. Construction of the reel servos 36, 46 is simplified in that there is no need for circuitry to convert a unipolar signal into a bipolar signal suitable for bi-directional control of the reel motors 34, 38 respectively. It will be appreciated that the construction and operation of the position indicating circuit 42 is substantially identical to that of the position indicating circuit 32.

The linearity of the output can be readily demonstrated. The currents through the two capacitances $C_{54}$ and $C_{56}$ associated with lower plates 54 and 56 are respectively:

$$I_{54} = S\,C_{54}\,(V - V_0) \qquad (1)$$

$$I_{56} = S\,C_{56}\,(V + V_0) \qquad (2)$$

where S is the Laplace operator, V is the magnitude of the applied reference voltage and $V_0$ is the voltage of upper plate 60. Ignoring the small current drain of amplifier 74, $I_{54}$ equals $I_{56}$ and $$V_0 = V\,\frac{C_{54} - C_{56}}{C_{54} + C_{56}} \qquad (3)$$

However, $$C_{54} = C_0 + K\,\theta \qquad (4)$$

$$C_{56} = C_0 - K\,\theta \qquad (5)$$

where $C_0$ is the capacitance of capacitances $C_{54}$ and $C_{56}$ when $\theta$ equals zero degrees and K is a constant of proportionately between the changes in $\theta$ and changes in capacitance. Substituting equations 4 and 5 into equation 3, it is seen that $$V_0 = V K\,\frac{\theta}{C_0} \qquad (6)$$

Since amplifier 74 provides a constant total amplification of 500, the DC system output signal Eout is $$Eout = \left(\frac{500\,VK}{C_0}\right)\theta \qquad (7)$$

Although there has been shown and described a particular arrangement of a member position indicating system in accordance with the invention, it will be appreciated that the invention is not limited thereto. Accordingly, all modifications, variations and equivalent arrangements within the scope of the appended claims should be considered to be within the scope of the invention.

What is claimed is:

1. For use in a tape transport, a tension arm position indicator system comprising:

a waveform generator generating first and second complementary square-wave signals;

a printed circuit board having a surface;

a tape loop tension arm disposed for rotation about an axis which is perpendicular to the surface, the tension arm having a conductive plate disposed for rotation therewith which is maintained at a fixed potential, the conductive plate being maintained parallel to and spaced a short distance apart from the surface of the printed circuit board as the tension arm rotates about the axis;

a pair of first capacitor plates, the first capacitor plates being coupled to receive the first and second complementary square-wave signals respectively and being formed as printed circuits on the surface of the printed circuit board in opposing relationship to the path of the tension arm conductive plate as the tension arm rotates about the axis;

a second capacitor plate disposed in opposing, parallel spaced relationship to the first pair of capacitor plates with the tension arm conductive plate being movable within a space between the first and second capacitor plates, the second capacitor plate providing a first output signal;

a single amplifier which is AC coupled to receive the first output signal and generate an amplified first output signal and which is DC coupled to receive a tension arm position signal and generate an amplified tension arm position signal as a system output in response thereto; and a phase detector coupled to compare the phase relationship of the amplified first output signal and the complementary square-wave signals and provide a tension arm position signal having a DC component with a magnitude dependent upon the magnitude of the amplified first output signal and a polarity dependent upon the relative phase relationships of the amplified first output signal and the complementary square-wave signals.

2. For use in a digital magnetic tape transport having at least one tape loop tension arm rotating about an axis and forming a buffer tape loop, a tension arm position indicating system comprising:

a waveform generator generating first and second complementary square-wave reference signals having substantially equal magnitudes and opposite phases;

a pair of first capacitor plates positioned in a plane in electrically insulated abutting relationship, said first plates being generally symmetrical about a line passing through the tension arm axis of rotation, each first plate being connected to receive a different square-wave reference signal;

a pair of electrically connected second capacitor plates at least substantially coextensive with the first capacitor plates disposed in spaced apart opposing relationship thereto;

a third grounded capacitor plate coupled to rotate with the tension arm and vary the capacitance between the pairs of opposing first and second plates differentially in accordance with the position of the tension arm;

an amplifier having positive and negative inputs, an output and a feedback impedance connected between the output and the negative input, the positive input being coupled to the second capacitor plates;

a first impedance and a high pass filter connected in series between the negative input and ground respectively, the relative magnitudes of the feedback impedance and the first impedance determining the degree of AC amplification for the amplifier;

a diode bridge switching circuit having an anode terminal, a cathode terminal, an input terminal and an output terminal;

a pair of substantially matched impedances connecting the anode and cathode terminals to the first and second reference signals respectively;

a high pass filter connected between the switching circuit input and amplifier output;

a holding capacitor connected between the switching circuit output and ground;

a second impedance connected between the switching circuit output and the negative amplifier input, the relative magnitudes of the feedback and second impedances determining the degree of DC amplification of the amplifier; and a low pass output filter having an input connected to the amplifier output and an output providing a bipolar DC system output signal indicative of the position of rotation of the tension arm.

3. The tension arm position indicator system according to claim 1 above, wherein the phase detector includes a four terminal diode bridge terminal network having two pairs of series connected diodes connected to carry current between the first and second terminals, the first and second terminals each being coupled through resistances to the first and second complementary square-wave signals respectively, a third terminal at a connection between one pair of series connected diodes being coupled to receive the amplified first output signal, and the tension arm position signal being generated at a fourth terminal at a connection between the other pair of series connected diodes.

* * * * *